UNITED STATES PATENT OFFICE.

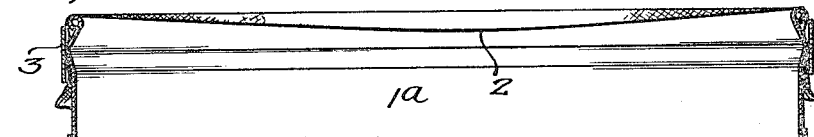
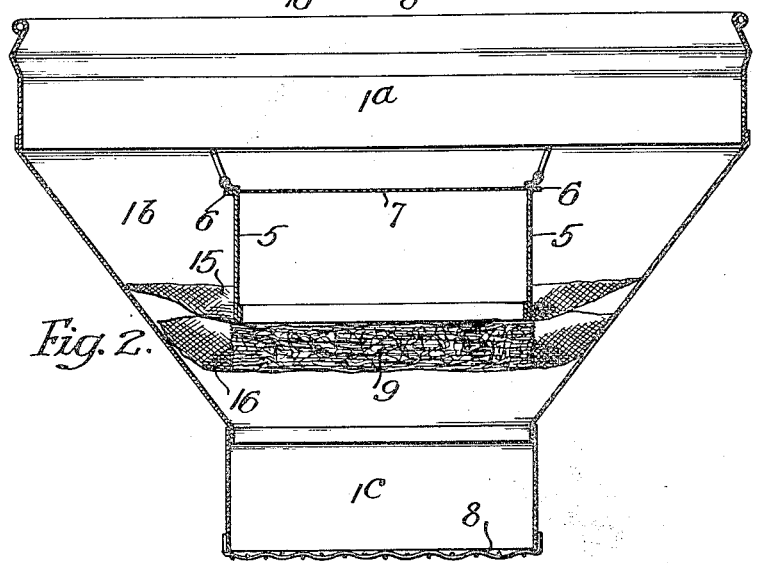
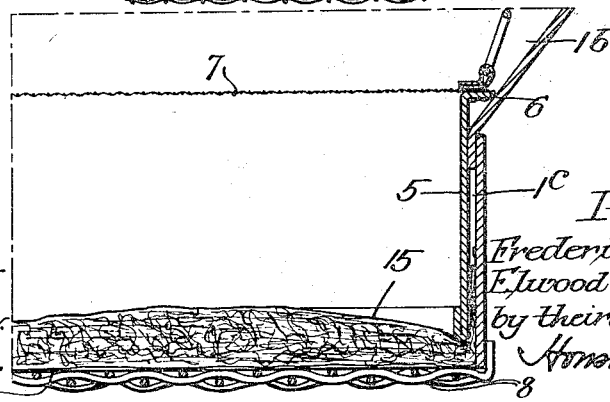

FREDERICK O. P. SHUTT AND ELWOOD C. DUKEMAN, OF HONEY BROOK, PENNSYLVANIA, ASSIGNORS TO SAID SHUTT.

MILK-STRAINER.

1,036,354.    Specification of Letters Patent.    Patented Aug. 20, 1912.

Application filed December 8, 1911. Serial No. 664,612.

*To all whom it may concern:*

Be it known that we, FREDERICK O. P. SHUTT and ELWOOD C. DUKEMAN, citizens of the United States, and residents of Honey Brook, Chester county, Pennsylvania, have invented certain Improvements in Milk-Strainers, of which the following is a specification.

Our invention relates to straining devices for milk; and the object of our invention is to provide a cheap and simple device, thoroughly hygienic in character and efficient in use. These and other features of our invention are more fully described hereinafter, reference being had to the accompanying drawings forming part thereof, in which:

Figure 1, is a sectional view of the strainer structure in the position of use; Fig. 2, is a similar sectional view illustrating certain of the parts in separated condition, and Fig. 3, is an enlarged sectional view of a portion of the structure.

In the drawings, 1 represents the strainer structure which may be, generally speaking, in the form of a funnel, adapted to fit into a suitable receptacle and through which milk to be contained in such receptacle may be passed. The strainer structure has an upper annular portion $1^a$; a gradually contracting middle portion $1^b$, and a contracted lower portion $1^c$. Over the upper portion a section of cheese-cloth or similar material indicated at 2 is preferably stretched, and through this the milk is initially passed. To keep this cloth in a substantially taut condition, a wire or band 3 may be stretched around the same in engagement with the portion $1^a$ of the strainer structure, in the manner indicated. Within the lower contracted portion $1^c$ of the structure, we provide straining means consisting of a sleeve-like element 5, substantially filling or fitting within such contracted portion, such element 5 having a flange 6, or a series of projections to overlie the inclined wall of the lower part of the middle portion $1^b$ of the funnel, and over the top of said sleeve-like member a section of fine wire gauze, indicated at 7, is secured. The bottom of the contracted portion $1^c$ is covered by a wire screen 8, preferably coarse, and between the same and the sleeve-like element straining means are provided in the shape of a layer of absorbent cotton 9, which is preferably confined between two layers of cheese cloth or similar material, indicated at 15 and 16. Fig. 2 shows the manner in which this portion of the structure is assembled. The two sections of cheese-cloth with the layer of absorbent cotton between the same are placed in the lower part of the tapering portion $1^b$ of the structure; then the tubular sleeve-like element 5 is placed over the same, and then forced into the lower contracted part; compressing the absorbent cotton at or adjacent the margin of the same, and pressing the bulk of the same against the coarse wire bottom screen 8; the flange 6, (or projections) contacting with the inclined walls of the central portion of the structure. The section of cheese-cloth at the top of the structure is then stretched into place and confined, and then the device is ready for use.

It will be seen that all of the milk passed into the straining structure must pass through the absorbent cotton. In practice, the flange 6 may have a tight fit adjacent the inclined walls so that practically no milk passes down between the same. Should milk pass such structure, however, it will be trapped since the absorbent cotton is compressed to such an extent as to prevent its ready passage, and if it should pass, it must go through such absorbent cotton.

We claim:

1. In a strainer, the combination of a receptacle having a contracted tubular outlet said outlet having a foraminous bottom, a removable sleeve-like element, and a body of fibrous material having fabric covered upper and lower surfaces, said sleeve-like element having a foraminous top and being open at the bottom and having an external diameter about equal to the interior diameter of said outlet, the edges of the fabric covered surfaces of the body of fibrous material extending beyond the body and adapted to be turned up against the edge thereof and against each other and to be confined between the wall of the tubular outlet and the wall of said sleeve-like element.

2. The combination, in a milk strainer, of a substantially funnel-shaped shell or casing having a contracted outlet, a supplemental sleeve-like element disposed therein, a coarse wire bottom for said funnel-shaped structure, a fine gauze wire top for the outlet of said sleeve-like element, a layer of absorbent cotton interposed between the sleeve-like element and the coarse wire at the bottom of the funnel-shaped casing, and foraminous retaining layers inclosing said absorbent cotton, said sleeve-like element having its bottom adapted to compress said layer around the edge.

In testimony whereof, we have signed our names to this specification, in the presence of two subscribing witnesses.

FREDERICK O. P. SHUTT.
ELWOOD C. DUKEMAN.

Witnesses:
GEORGE PLANK,
C. E. GRIFFITH.